United States Patent [19]

Benjamin et al.

[11] 3,941,014
[45] Mar. 2, 1976

[54] PRECISION HEAVY DUTY INDEXER

[75] Inventors: Milton L. Benjamin, Chagrin Falls; David D. Walker, Solon, both of Ohio

[73] Assignee: Erickson Tool Company, Solon, Ohio

[22] Filed: Jan. 20, 1975

[21] Appl. No.: 542,106

[52] U.S. Cl. .................................. 74/826; 74/813 C
[51] Int. Cl.² .......................................... B23B 29/32
[58] Field of Search ... 74/826, 813 L, 813 C, 813 R

[56] References Cited
UNITED STATES PATENTS

| | | | |
|---|---|---|---|
| 2,952,169 | 9/1960 | Johnson | 74/826 X |
| 3,797,333 | 3/1974 | Maier | 74/826 |

*Primary Examiner*—Samuel Scott
*Assistant Examiner*—F. D. Shoemaker
*Attorney, Agent, or Firm*—Donnelly, Maky, Renner & Otto

[57] ABSTRACT

A precision heavy duty indexer characterized in that the indexing member is hydraulically actuated to a locking position whereat it is locked to the indexer housing in desired precise indexed position without circumferential or radial play and without transmission of torque load to the indexer drive means or without transmission of radial load to the indexing member-housing bearings; and is hydraulically actuated to unlocking position whereat it is released from said housing for indexing movement and whereat it is engaged by said drive means operative to index the indexing member to the next indexed position. The indexer herein is further characterized in that the indexer drive means comprises a hydraulic motor driven worm which meshes with a worm wheel having driving engagement with said indexing member, said worm having a sensor-counter thereon to de-energize said hydraulic motor when the indexing member has been indexed through a predetermined angle from one indexed position to the next.

25 Claims, 7 Drawing Figures

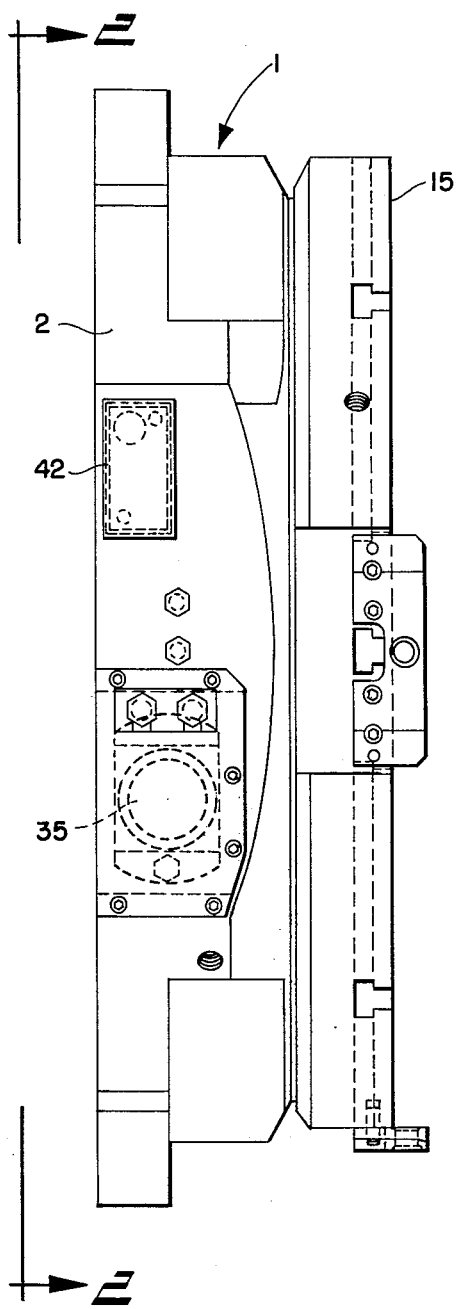
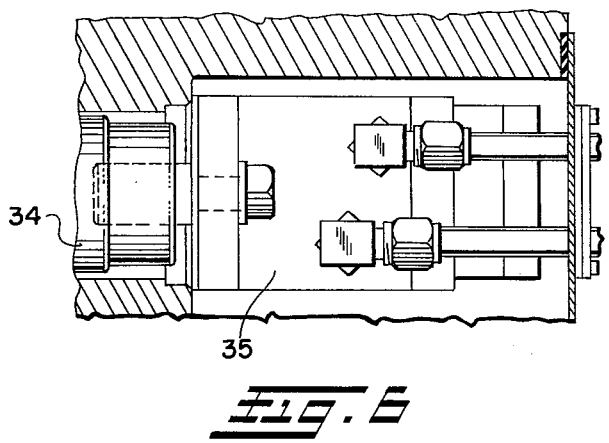
Fig. 6
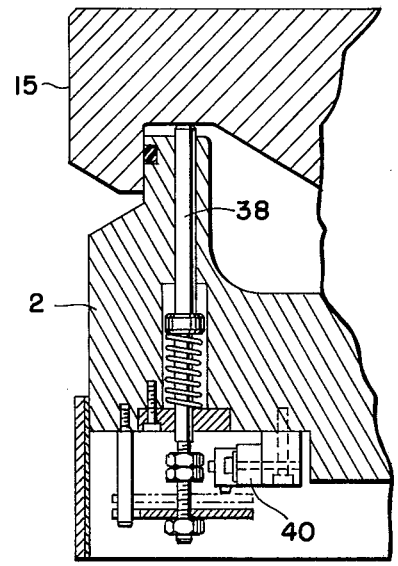
Fig. 7
Fig. 1

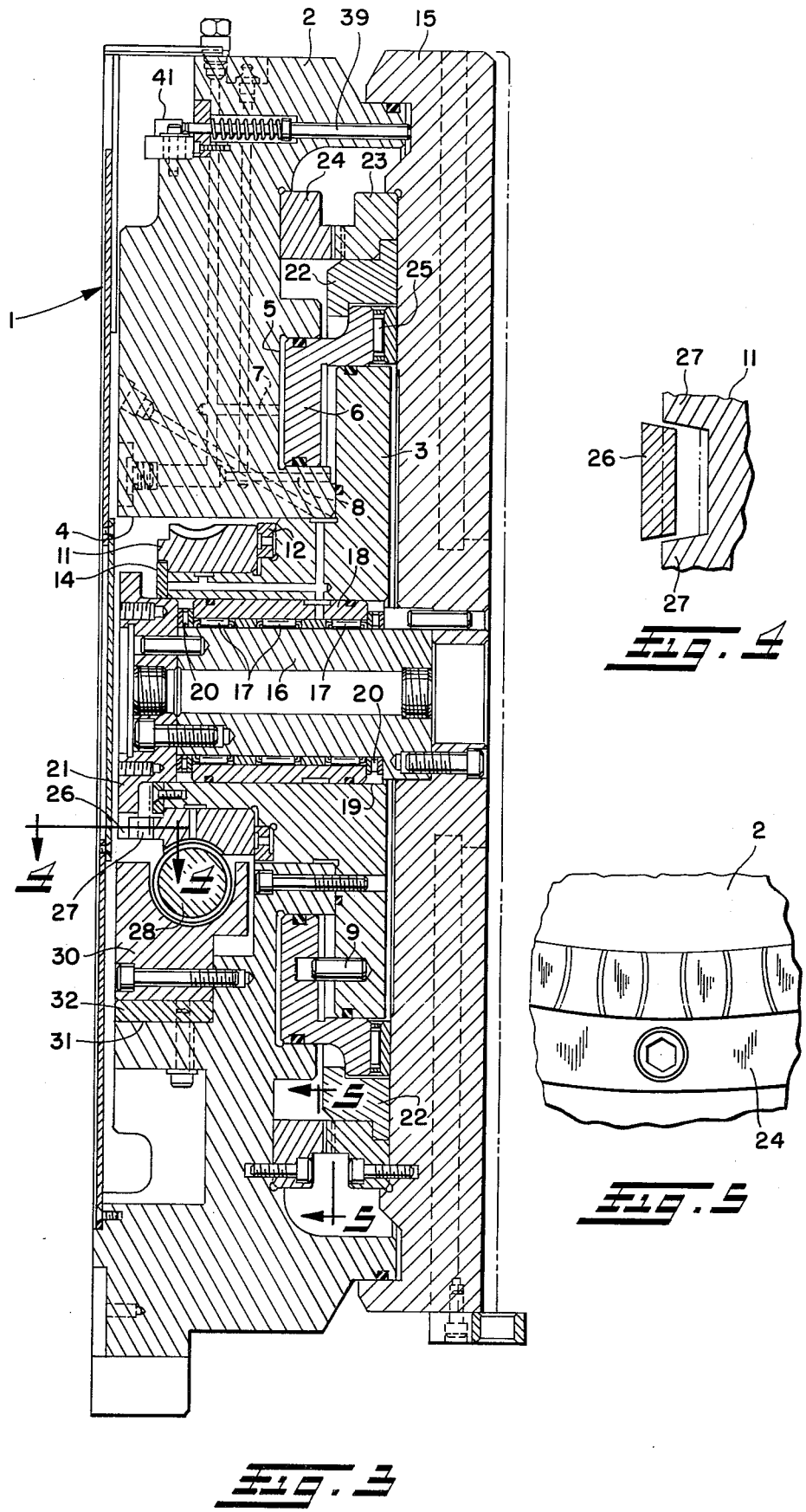

PRECISION HEAVY DUTY INDEXER

BACKGROUND OF THE INVENTION

In known indexers such as disclosed in the U.S. Pat. Nos. 2,600,960, 2,754,700, 2,883,886, 3,035,461, and 3,439,458 an indexing member is rotatably supported in a housing and has thereon an index plate or ratchet wheel with which an index pin in the housing is engaged to lock the indexing member in selected indexed positions, torque and radial loads on the indexing member respectively being imposed on the index pin and on the housing-indexing member bearings. To relieve the index pin of torque load as aforesaid it has been proposed, as in U.S. Pat. Nos. 2,793,866 and 3,113,474, to provide a two-part brake which is engaged around a cylindrical portion of the indexing member. To relieve both torque load on the index pin and radial load on the bearings between the housing and indexing member it has been proposed to employ a disc-type brake which is axially flexed and frictionally clamped between the housing and a hydraulically actuated ring as disclosed, for example, in the pending application of Milton L. Benjamin and David D. Walker, Ser. No. 484,767, filed July 1, 1974.

It is also known from U.S. Pat. No. 2,785,579, for example, to provide an indexer in which the indexing member is indexed through a worm drive between the index plate (or ratchet wheel) and the spindle of the indexing member, such worm drive being self-locking thus to obviate the necessity of providing an index pin of the character above indicated. However, torque load on the indexing member is transmitted to the teeth of the worm drive and radial load on the indexing member is transmitted to the housing-indexing member bearings.

SUMMARY OF THE INVENTION

In contradistinction to the foregoing, the present heavy duty precision indexer has an indexing member which is accurately and securely locked to the indexer housing by annular rows of axially interfitting radially extending teeth of form such as to eliminate axial, circumferential, and radial play in all indexed positions. Moreover, torque loads on the indexing member are not imposed on the indexing member drive means and radial loads on the indexing member are not imposed on the bearings between the housing and indexing member.

It is a principal object of this invention to provide an indexer of the character indicated in which the indexing member is axially shifted with respect to the housing to disengage the aforesaid teeth and to engage the indexing member spindle with a drive means operative to index the indexing member to the next selected position, whereupon, the indexing member is shifted axially to re-engage the interfitting teeth of the housing and indexing member to lock the indexing member in the next selected indexed position.

It is another object of this invention to provide an indexer of the character indicated in which the drive means for the indexing member comprises a hydraulic motor-driven worm which meshes with a worm wheel rotatable in the housing, said worm wheel having teeth which axially interfit with teeth of a drive member affixed to the indexing member spindle, and said teeth being in positive interengagement without circumferential play when the indexing member is shifted to indexing position. Said teeth are yet in interfitting relation with clearance, however, when the indexing member is shifted to locked position as previously mentioned.

Yet another object of this invention is to provide an indexer in which the housing thereof is provided with a sensor and counter to count the number of full or part revolutions of the aforesaid worm so as to index the indexing member through a selected angle from one position to the next, said sensor-counter being operative to discontinue the rotation of the worm when a desired number or revolutions or part revolutions has occurred whereupon valve means will be actuated to activate a piston connected to the indexing member to engage the housing and indexing member teeth to securely lock the indexing member in selected index position.

Other objects and advantages will appear from the ensuing description.

BRIEF DESCRIPTION OF THE DRAWING

FIG. 1 is a side elevation view of a preferred form of the present invention;

FIG. 3 is a cross-section view taken substantially along the line 3—3, FIG. 2; and FIGS. 4, 5, 6, and 7 are fragmentary cross-section views on enlarged scale taken along the respective lines 4—4, 5—5 (FIG. 3), and 6—6, 7—7 (FIG. 2).

DETAILED DESCRIPTION OF THE PREFERRED EMBODIMENT

Figure 2:
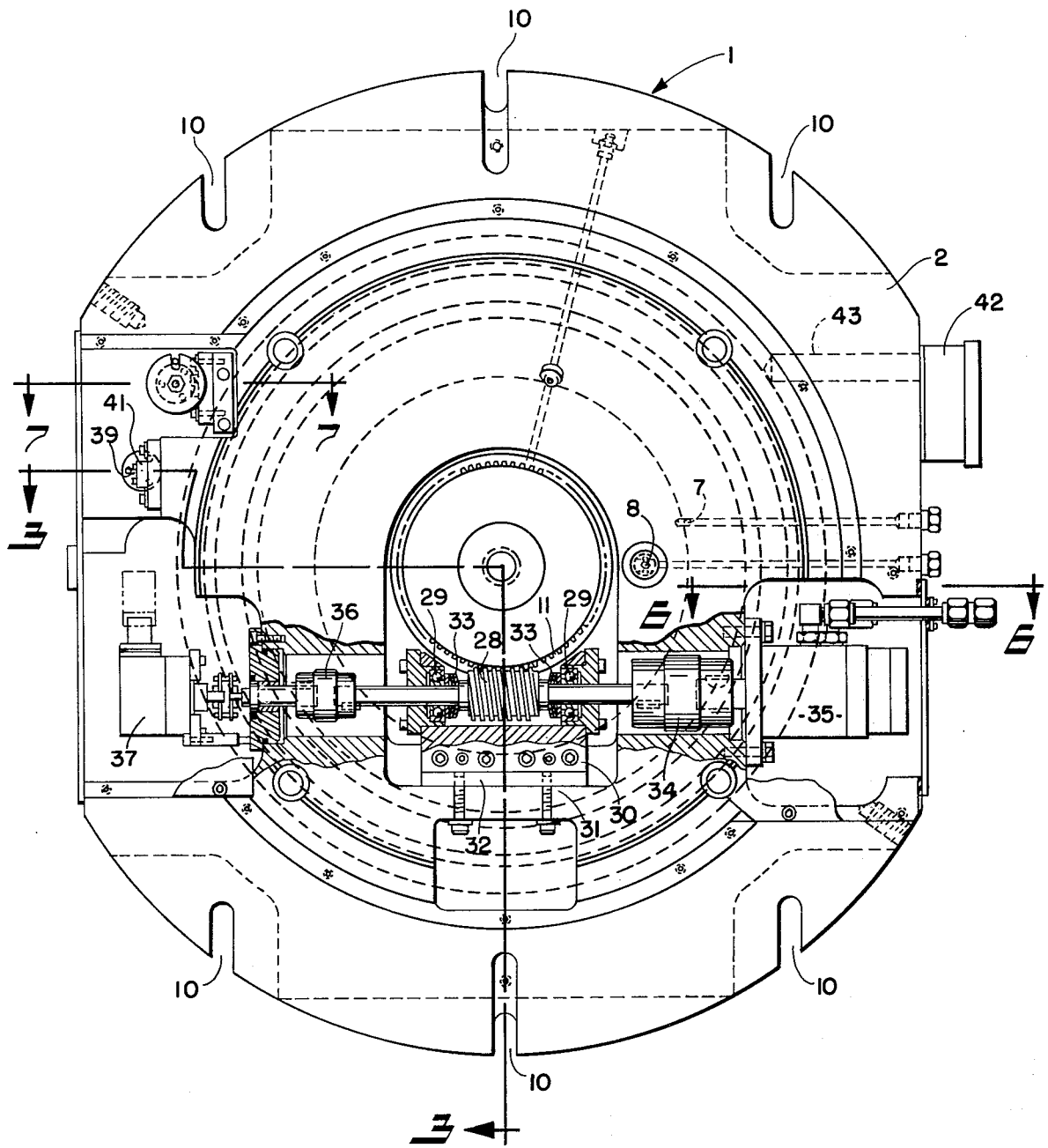
FIG. 2 is a rear elevation view as viewed substantially along the line 2—2, FIG. 1.

Referring now in detail to the drawings, the indexer 1 herein comprises a housing assembly including a main housing part 2 and an inner tubular housing part 3 piloted in the central bore 4, said parts being bolted together as shown and defining an annular cylinder 5 in which the piston 6 is actuated to the right or left as viewed in FIG. 3 by admitting fluid under pressure through the passage 7 or 8, said passages being connected to a four-way valve or the like not shown. Dowels 9 hold the piston 6 against rotation. The main housing part 2 is adapted to be fixedly secured on a support therefor through the mounting slots 10.

The portion of the inner housing part 3 which extends in bore 4 rotatably supports a worm wheel 11 between thrust bearing 12 and retainer plate 14.

The indexing member 15 herein is shown as a plate-like member having radially extending T-slots in which suitable jaws (not shown) are engaged for mounting of a workpiece on the face of said indexing plate 15. Secured to said indexing plate 15 as by dowel pins and screws as shown is a spindle member 16, the indexing member 15 being rotatably supported in the housing assembly by roller bearings 17 engaged within a race 18 which is axially slidable in the central bore 19 of said inner housing part 3. There are also provided axial thrust bearings 20 between a shoulder of said spindle member 16 and the shoulder of a drive member 21 which is secured as by dowel pins and screws to the axially inner end of said spindle member 16.

The indexing plate 15 and main housing part 2 have coaxial rings 23 and 24 secured thereto by screws as shown and are provided with annular rows of interfitting teeth which as best shown in FIG. 5 extend radially but have tapered sides and one set of teeth (on ring 24 for example) has convexly curved sides and the other set of teeth (on ring 23 for example) has concavely curved sides whereby when said teeth are in interengagement as by actuating the piston 6 toward the left as viewed in FIG. 3, the interengagement of the teeth will eliminate circumferential and radial play and will retain the face of the indexing plate 15 perpendicular to the indexing axis whereby the indexing plate 15 will be securely held in coaxial relation in all indexed positions with respect to the main housing part 2. Between the piston 6 and the index plate 15 is an axial thrust bearing 25 and when fluid pressure is admitted through the passage 7, the piston 6 will through the axial thrust bearing 25 move the index plate 15 and spindle 16 to the right to the phantom line position shown in FIG. 3 to disengage the teeth on the rings 23 and 24 so that the index plate 15 and the workpiece held thereby may be indexed to the next position. By way of illustrative example, the rings 23 and 24 are provided with 72 teeth so that the indexing movement is precisely 5° or any multiple thereof. A ring 22 has radially inner and outer flanges which respectively overlap the peripheral flange of piston 6 and counterbore in the ring 23 whereby when piston 6 is moved to the FIG. 3 position the plate 15 is actuated to locked position with the teeth of rings 23 and 24 in tight interengagement. The axial force of ring 22 on ring 23 is in line with the teeth of ring 23 so as to avoid deflection of the latter to dish-shaped form.

With reference to the index plate 15 drive, the drive member 21 has wide tapered teeth 26 which interfit with corresponding tapered teeth 27 in the worm wheel 11 arranged to be in interfitting relation with clearance, as shown in FIGS. 3 and 4, when the indexing member 15 is in its locked indexed position. When the piston 6 is actuated to the right as viewed in FIG. 3 to the phantom line position, the drive member 21 will have the tapered sides of its teeth 26 engaged with the tapered sides of the teeth 27 in the worm wheel 11 to provide a positive drive without circumferential play. When the teeth 26 and 27 are thus engaged the worm wheel 11 is pressed against thrust bearing 12.

Engaged with the worm wheel 11 is a worm 28 which is rotatably supported in bearings 29 in a block 30 which is secured by screws as shown to the main housing part 2. Interposed between the bottom of said block 30 and a shelf 31 in the main housing part 2 is a shim plate 32 of precise thickness so as to obtain proper engagement of the worm 28 with the worm wheel 11 while the worm 28 is yet freely rotatable in the bearings 29. One end of the worm 28 shaft is keyed in a jaw coupling 34 which in turn is secured to the drive shaft of a hydraulic motor 35 having conduits respectively leading to a reservoir and to a two-way control valve (not shown) in a fluid pressure supply line. The other end of the worm 28 shaft is keyed to a jaw coupling 36 which in turn is keyed to the shaft of a sensor-counter unit 37 which senses and counts the number of half revolutions of the worm 28 to obtain desired degrees of indexing of the indexing member 15 as determined by suitable tape or other control means not shown. In the present example, the worm wheel 11 may be provided with 72 teeth whereby with a worm 28 as herein shown, the worm wheel 11 will be rotated 5° for each half revolution of the worm 28. The worm 28 is held in centered position as by the Belleville washers 33 and, hence, is capable of yielding to absorb large inertia loads as may be caused by starting and stopping of a heavy workpiece on the index plate 15.

To prevent entry of chips, dirt, or cutting fluid or other foreign matter from the annular rows of teeth on the rings 23 and 24, the main housing part 2 and index plate 15 have telescoped peripheral portions and an 0-ring therebetween forms a sliding seal and of course other 0-rings as shown are effective to seal the piston 6 and cylinder 5 assembly and the bearing sleeve 18.

To persons skilled in the art it will be evident that suitable controls will be provided to achieve automatic operation of the indexer 1 herein in relation to the operation of the grinding machine or other machine tool with which the indexer 1 is associated to perform various machining operations on the workpiece which is indexed from one position to the next. To that end, switch actuating plungers 38 and 39 are provided in the main housing part respectively to actuate the switch 40 and 41 when the index plate 15 is in indexing position and in locked position. Similarly, the sensor-counter unit 37 will be operatively connected to a tape control device (not shown) and said tape control device will open a two-way valve or the like to operate the hydraulic motor 35 until the sensor unit 37 detects the required number of half revolutions of the worm 28 whereupon the two-way valve will be closed to discontinue the indexing movement and a four-way valve will be actuated to cause the piston 6 to draw the index plate 15 to locked position.

One side of the main housing part 2 may have secured thereto an electrical connection box 42 which communicates with a passage 43 for the leads of the switches 40 and 41 and of the sensor-counter unit 37. The housing part 2 has a wiring channel which covered by a rear cover plate 45 and a side cover plate 46 provides access to said switches 40 and 41 and the sensor-counter unit 37.

The present indexer is of very large size for handling large heavy workpieces and by way of illustrative example the diameter of the indexer plate 15 may be about 30 inches and hence it is necessary to isolate torque loads from the drive means 21-11-28 and radial loads from the spindle bearings 17 and to that end the annular rows of interfitting teeth on the rings 23 and 24 have convex and concave sides which eliminate circumferential and radial play and by reason of the large number of such teeth, namely 72, for example, the indexing member 15 may be indexed exactly 5° or a multiple thereof without any change of parts, whereas in known indexers, a plurality of index plates or ratchet wheels may be needed and, in addition, where index pins are employed different cam plates are required for changes in indexing angles.

With an indexer such as herein disclosed the accuracy of the indexing angle can easily be held to within ±2 sec. Moreover, by reason of the worm 28 and worm wheel 11 ratio, the worm 28 need not be stopped at exactly a half revolution or multiple thereof by reason of the taper of the interfitting teeth 26 and 27 of the drive member 21 and worm wheel 11 and the tapered sides of the interfitting locking teeth on rings 23 and 24. In the specific example herein disclosed, 180° turning of the worm 28 effects 5° turning of the worm wheel 11 and of the index plate 15 whereby 36° rotation of the worm 28 effects only 1° turning of the worm wheel. Accordingly, the stopping of the rotation of the worm 28 within a degree or two of a half revolution or multiple thereof will result in only a turning of the index member 15 either 1/36 or 1/18 of a degree. In any event when the index member 15 is moved to locked position, the tapered teeth of the rings 23 and 24 will accurately position said index member 15 at its 5° (or multiple thereof) position. Moreover, excessive loading of the worm 28 and worm wheel 11 teeth is precluded when starting or stopping the indexing movement of the indexing member 15 by yielding of the Belleville washers 33 and, of course, when the indexing member 15 and workpiece mounted thereon comes to rest, the worm 28 is recentered by the Belleville springs 33.

The embodiments of the invention in which an exclusive property or privilege is claimed are defined as follows:

1. An indexer comprising a fixed housing having a bore therethrough; an indexing member having a spindle portion journaled in said bore for rotary indexing movement about the axis of said bore; said housing and indexing member having annular rows of axially interfitting radial teeth which respectively have tapered convexly and concavely curved sides which when interengaged rigidly retain the indexing member in any of its indexed positions coaxially of said bore and against circumferential and radial play; actuating means in said housing for axially moving said indexing member in one direction to disengage said teeth thus to release said indexing member for indexing movement, and in the opposite direction to engage said teeth to lock said indexing member as aforesaid; drive means in said housing for imparting rotary indexing movement to said indexing member when said teeth are disengaged; said drive means including a rotary drive member coaxially around said bore; said drive member and said spindle portion having other axially interfitting tapered teeth which are interengaged when said indexing member is moved in such one direction and which yet interfit with clearance when said indexing member is moved in such opposite direction.

2. The indexer of claim 1 wherein said actuating means comprises an annular cylinder in said housing coaxially around said bore, and a piston reciprocable in said cylinder, said piston being connected to said indexing member to impart axial movement to the latter in such opposite directions responsive to actuation of said piston in opposite directions in said cylinder.

3. The indexer of claim 2 wherein axial thrust bearing means between said piston and said indexing member imparts movement to said indexing member in such one direction and facilitates rotary indexing of said indexing member by said drive means.

4. The indexer of claim 3 wherein said housing has means to prevent rotation of said piston in said cylinder.

5. The indexer of claim 2 wherein said annular rows of teeth are on rings respectively secured to said housing and said indexing member; and wherein a flanged ring on said indexing member has a radially outwardly extending flange overlapping said indexing member ring opposite the row of teeth thereon and has a radially inwardly extending flange overlapping a radially outwardly extending flange at the end of said piston through which said indexing member is moved in such opposite direction.

6. The indexer of claim 5 wherein axial thrust bearing means between the flanged end of said piston and said indexing member transmits axial movement of said piston in such one direction to said indexing member and facilitates rotary indexing of the latter when the teeth of said rings are disengaged.

7. The indexer of claim 1 wherein said drive member comprises a worm wheel having engagement with a motor driven worm; said worm wheel and said spindle portion having such other axially interfitting teeth to transmit rotation of said worm wheel into rotary indexing movement of said indexing member.

8. The indexer of claim 7 wherein a sensor-counter unit in said housing is operatively connected to said worm to control the operation of said motor for indexing said indexing member through a predetermined angle equal to the pitch of said annular rows of teeth or a multiple thereof.

9. The indexer of claim 7 wherein said worm wheel has engagement with axial thrust bearing means in said housing when said other axially interfitting tapered teeth are interengaged to maintain alignment of said worm wheel with said worm.

10. The indexer of claim 1 wherein said drive member comprises a worm wheel having engagement with a worm provided with oppositely extending shaft portions journaled in axially spaced apart bearings in said housing; and Belleville spring washers yieldably retaining said worm in centered position between said bearings and permitting axial yielding movement of said worm due to inertia loads at the beginning and end of the indexing movement of said indexing member.

11. An indexer comprising a housing having a bore therethrough; an indexing member having a spindle portion with bearings thereon and a surrounding sleeve which is axially slidable in said bore for axial movement and rotary indexing movement of said indexing member about the axis of said bore; said housing and indexing member having annular rows of axially interfitting tapered teeth which when interengaged rigidly retain the indexing member in any of its indexed positions coaxially of said bore and against circumferential and radial play; actuating means in said housing for axially moving said indexing member in one direction to disengage said teeth thus to release said indexing member for rotary indexing movement, and in the opposite direction to engage said teeth to lock said indexing member as aforesaid; drive means in said housing for imparting rotary indexing movement to said indexing member when said teeth are disengaged; said drive means including a rotary drive member coaxially around said bore; said drive member and said spindle portion having other axially interfitting tapered teeth which are interengaged when said indexing member is moved in such one direction and which yet interfit with clearance when said indexing member is moved in such opposite direction whereby, when said indexing member is in locked indexed position, torque and radial loads on said indexing member are not imposed on said drive means and said bearings.

12. The indexer of claim 11 wherein said actuating means comprises an annular cylinder in said housing coaxially around said bore, and a piston reciprocable in said cylinder, said piston being connected to said indexing member to impart axial movement to the latter in such opposite directions responsive to actuation of said piston in opposite directions in said cylinder.

13. The indexer of claim 12 wherein axial thrust bearing means between said piston and said indexing member imparts movement to said indexing members in such one direction and facilitates rotary indexing of said indexing member by said drive means.

14. The indexer of claim 13 wherein said housing has means to prevent rotation of said piston in said cylinder.

15. The indexer of claim 12 wherein said annular rows of teeth are on rings respectively secured to said housing and said indexing member; and wherein a flanged ring on said indexing member has a radially outwardly extending flange overlapping said indexing member ring opposite the row of teeth thereon and has a radially inwardly extending flange overlapping a radially outwardly extending flange at the end of said piston through which said indexing member is moved in such opposite direction.

16. The indexer of claim 15 wherein axial thrust bearing means between the flanged end of said piston and said indexing member transmits axial movement of said piston is such one direction to said indexing member and facilitates rotary indexing of the latter when the teeth of said rings are disengaged.

17. The indexer of claim 11 wherein said drive member comprises a worm wheel having engagement with a motor driven worm; said worm wheel and said spindle portion having such other axially interfitting teeth to transmit rotation of said worm wheel into rotary indexing movement of said indexing member.

18. The indexer of claim 17 wherein a sensor-counter unit in said housing is operatively connected to said worm to control the operation of said motor for indexing said indexing member through a predetermined angle equal to the pitch of said annular rows of teeth or a multiple thereof.

19. The indexer of claim 17 wherein said worm wheel has engagement with axial thrust bearing means in said housing when said other axially interfitting tapered teeth are interengaged to maintain alignment of said worm wheel with said worm.

20. The indexer of claim 11 wherein said drive member comprises a worm wheel having engagement with a worm provided with oppositely extending shaft portions journalled in axially spaced-apart bearings in said housing; and Belleville spring washers yieldably retaining said worm in centered position between said bearings and permitting axial yielding movement of said worm due to inertia loads at the beginning and end of the indexing movement of said indexing member.

21. An indexer comprising a housing having a main housing part and a tubular inner housing part secured together with said inner part piloted in a central bore in main part; said main part having an annular groove coaxially around said bore which in conjunction with a radial flange of said inner part forms an annular cylinder; a ring secured to said main part coaxially around said groove having an annular row of axially extending teeth; an indexing member comprising a platelike portion having a ring secured thereto with an annular row of teeth adapted to be engaged with and disengaged from the teeth of the ring on said main part upon axial movement of said indexing member, and a spindle portion journaled in a sleeve which is axially slidable in a central bore in said inner part; a piston reciprocable in said cylinder having an annular portion surrounding said flange and operatively connected to said platelike portion to impart axial movement to said indexing member to engage and disengage the teeth of said ring; drive means rotatable on said inner part engaged with said spindle portion to impart rotary indexing movement to said indexing member when said teeth are disengaged; said drive means and spindle portion having other axially interfitting teeth which are interengaged when said indexing member is moved to disengage the teeth of said rings and which axially interfit with clearance when said indexing member is moved to engage the teeth of said rings whereby in the lastmentioned position of said indexing member torque load on said indexing member is not imposed on said drive means.

22. The indexer of claim 21 wherein said drive means is a worm wheel which is driven by a worm journaled in a bearing member secured to said main part.

23. The indexer of claim 22 wherein said worm is supported in said bearing member for axial yielding movement due to inertia loads at the beginning and end of the indexing movement of said indexing member.

24. The indexer of claim 22 wherein a hydraulic motor secured to said main part is operatively connected to said worm.

25. The indexer of claim 24 wherein a sensor-counter unit secured to said main part is operatively connected to said worm to control the operation of said hydraulic motor for indexing said indexing member through a predetermined angle equal to the pitch of the teeth of said rings or a multiple thereof.

* * * * *